(12) United States Patent
Kwon et al.

(10) Patent No.: US 9,066,324 B2
(45) Date of Patent: Jun. 23, 2015

(54) METHOD AND SYSTEM FOR PEER-TO-PEER COMMUNICATION IN A COMMUNICATION SYSTEM

(75) Inventors: Il-Won Kwon, Ansan-si (KR);
Jong-Hyung Kwun, Seongnam-si (KR);
Sang-Min Lee, Seoul (KR)

(73) Assignee: SAMSUNG ELECTRONICS CO., LTD, Suwon-Si (KR)

( * ) Notice: Subject to any disclaimer, the term of this patent is extended or adjusted under 35 U.S.C. 154(b) by 1359 days.

(21) Appl. No.: 12/217,571

(22) Filed: Jul. 7, 2008

(65) Prior Publication Data

US 2009/0017858 A1 Jan. 15, 2009

(30) Foreign Application Priority Data

Jul. 9, 2007 (KR) .................. 10-2007-0068877

(51) Int. Cl.
*H04B 7/00* (2006.01)
*H04W 40/00* (2009.01)
*H04W 4/00* (2009.01)
*H04W 24/00* (2009.01)
*H04M 3/42* (2006.01)
*H04W 76/02* (2009.01)

(52) U.S. Cl.
CPC .................. *H04W 76/023* (2013.01)

(58) Field of Classification Search
CPC ................................ H04W 72/0406

USPC ........ 455/518, 446, 416, 423, 422.1; 370/342
See application file for complete search history.

(56) References Cited

U.S. PATENT DOCUMENTS

| 5,903,618 | A  | * | 5/1999  | Miyake et al. ................. 375/356 |
| 7,580,711 | B1 | * | 8/2009  | Kraiem et al. ................. 455/446 |
| 2002/0146018 | A1 | * | 10/2002 | Kailamaki et al. ............. 370/401 |
| 2004/0114567 | A1 | * | 6/2004  | Kubler et al. .................. 370/349 |
| 2005/0055722 | A1 | * | 3/2005  | Lym ................................. 725/80 |
| 2006/0023689 | A1 | * | 2/2006  | Allen et al. .................... 370/342 |
| 2007/0109989 | A1 |   | 5/2007  | Nakagawa et al. |
| 2007/0291638 | A1 |   | 12/2007 | Chae et al. |
| 2008/0082698 | A1 | * | 4/2008  | Schnaare ....................... 709/250 |

FOREIGN PATENT DOCUMENTS

| JP | 2004015119 A | 1/2004 |
| JP | 2005-065102 | 3/2005 |
| KR | 10-2005-0101491 | 10/2005 |
| KR | 10-2006-0071445 | 6/2006 |

* cited by examiner

*Primary Examiner* — Opiribo Georgewill

(57) ABSTRACT

A method and system for establishing a P2P communication connection between mobile stations in a cellular communication system are provided, in which a first mobile station transmits a first request message requesting setup of a P2P communication connection to a base station, receives a neighbor table including information about mobile stations capable of P2P communications with the first mobile station from the base station, selects a second mobile station with which to establish the P2P communication connection using the neighbor table, and establishes the P2P communication connection with the second mobile station.

20 Claims, 4 Drawing Sheets

METHOD AND SYSTEM FOR PEER-TO-PEER COMMUNICATION IN A COMMUNICATION SYSTEM

CROSS-REFERENCE TO RELATED APPLICATION(S) AND CLAIM OF PRIORITY

This application claims the benefit under 35 U.S.C. §119(a) of a Korean Patent Application filed in the Korean Intellectual Property Office on Jul. 9, 2007 and assigned Serial No. 2007-68877, the entire disclosure of which is hereby incorporated by reference.

TECHNICAL FIELD OF THE INVENTION

The present invention generally relates to a Peer-to-Peer (P2P) communication method and system in a communication system. More particularly, the present invention relates to a P2P communication method and system of a cellular-based mobile station.

BACKGROUND OF THE INVENTION

In a communication system, a transmitting mobile station, i.e. a source mobile station, communicates with a receiving mobile station, i.e., a destination mobile station, in cellular communication mode or P2P communication mode. The source mobile station communicates with the destination mobile station through a base station in the cellular communication mode, whereas the source mobile station communicates directly with the destination mobile station without the aid of a base station in the P2P communication mode.

The P2P communication mode is available when the source mobile station and the destination mobile station are within the same cell or the destination mobile station is located within a maximum distance from the source mobile station over which a signal from the source mobile station can reach the destination mobile station. Compared to the cellular communication mode, the P2P communication mode offers the benefit of high system efficiency.

For a cellular-based mobile station to operate in the P2P communication mode, the P2P communication mode should be initialized. However, the P2P communication mode initialization is viable only if the source mobile station has knowledge of the location of the destination mobile station. Therefore, there exists a need for a method for acquiring information about the location of the destination mobile station by the source mobile station.

SUMMARY OF THE INVENTION

To address the above-discussed deficiencies of the prior art, it is a primary object of the present invention to address at least the problems and/or disadvantages and to provide at least the advantages described below. Accordingly, an aspect of exemplary embodiments of the present invention is to provide a method and system for establishing a P2P communication connection for P2P communications by a cellular-based mobile station in a communication system.

Another aspect of exemplary embodiments of the present invention provides a method and system for carrying out P2P communication mode initialization to establish a P2P communication connection by a cellular-based mobile station in a communication system.

In accordance with an aspect of exemplary embodiments of the present invention, there is provided a method for establishing a P2P communication connection between mobile stations in a cellular communication system, in which a first request message requesting setup of a P2P communication connection transmitted to a base station by a first mobile station, a neighbor table including information about mobile stations capable of P2P communications with the first mobile station is received from the base station by the first mobile station, a second mobile station with which to establish the P2P communication connection is selected using the neighbor table by the first mobile station, and the P2P communication connection is established with the second mobile station by the first mobile station.

In accordance with another aspect of exemplary embodiments of the present invention, there is provided a method for establishing a P2P communication connection between mobile stations in a base station in a cellular communication system, in which a ready message is transmitted to mobile stations within a service area of the base station to transition the mobile stations to P2P active mode, upon receipt of a request message requesting setup of a P2P communication connection from a first mobile station, response messages including mobile station information about the mobile stations that transitioned to the P2P active mode are received from the mobile stations that transitioned to the P2P active mode, and a neighbor table including the mobile station information is generated and transmitted to the first mobile station.

In accordance with a further aspect of exemplary embodiments of the present invention; there is provided a method for establishing a P2P communication connection between mobile stations in a cellular communication system, in which P2P active mode is transitioned to by a first mobile station within a service area of a base station, upon receipt of a ready message commanding transition to the P2P active mode from the base station, a response message including information about the first mobile station is transmitted to the base station by the first mobile station, upon receipt of a request message requesting setup of a P2P communication connection from a second mobile station, and the P2P communication connection is initialized according to the request of the second mobile station and established with the second mobile station by the first mobile station.

In accordance with still another aspect of exemplary embodiments of the present invention, there is provided a system for establishing a P2P communication connection between mobile stations in a cellular communication system, in which a first mobile station transmits a first request message requesting setup of a P2P communication connection to a base station, receives a neighbor table including information about mobile stations capable of P2P communications with the first mobile station from the base station, selects a second mobile station with which to establish the P2P communication connection using the neighbor table, and establishes the P2P communication connection with the second mobile station.

In accordance with yet another aspect of exemplary embodiments of the present invention, there is provided a system for establishing a P2P communication connection between mobile stations in a cellular communication system, in which a base station transmits a ready message to mobile stations within a service area of the base station to transition the mobile stations to P2P active mode, upon receipt of a request message requesting setup of a P2P communication connection from a first mobile station, receives response messages including mobile station information about the mobile stations that transitioned to the P2P active mode from the mobile stations that transitioned to the P2P active mode, generates a neighbor table including the mobile station information, and transmits the neighbor table to the first mobile station.

In accordance with yet further aspect of exemplary embodiments of the present invention, there is provided a system for establishing a P2P communication connection between mobile stations in a cellular communication system, in which a second mobile station transitions to P2P active mode, upon receipt of a ready message commanding transition to the P2P active mode from a base station, transmits a response message including information about the second mobile station to the base station, upon receipt of a request message requesting setup of a P2P communication connection from a first mobile station, initializes the P2P communication connection according to the request of the first mobile station, and establishes the P2P communication connection with the first mobile station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication systems.

Exemplary embodiments of the present invention provide a method and system for conducting P2P communications in a cellular-based mobile station in a communication system.

The exemplary embodiments of the present invention also provide a method and system for initializing P2P communication mode in order to establish a P2P communication connection for P2P communications by a cellular-based mobile station. Particularly, the exemplary embodiments of the present invention also provide a method and system for, when a transmitting mobile station, i.e. a source mobile station, has no knowledge of the location of a receiving mobile station, i.e. a destination mobile station, acquiring information about the location of the destination mobile station through a base station and establishing a P2P communication connection with the destination mobile station by the source mobile station in a communication system.

Figure 1:
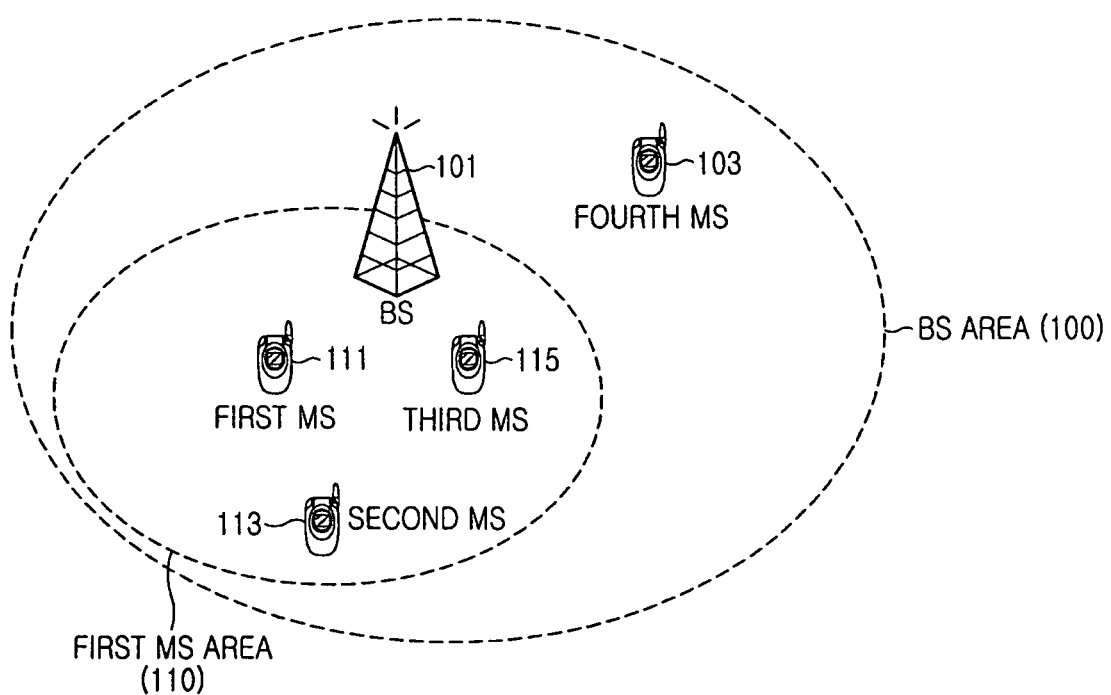
FIG. 1 illustrates a P2P communication mode operation in a communication system according to an exemplary embodiment of the present invention.

FIG. 1 illustrates a P2P communication mode operation in a communication system according to an exemplary embodiment of the present invention.

Referring to FIG. 1, the communication system includes a base station area 100 covering a maximum distance that a signal transmitted from a base station 101 can reach and a first mobile station area 110 covering a maximum distance that a signal transmitted from a first mobile station 111 can reach. Mobile stations 111, 113, 115 and 103 are within the base station area 100. In particular, the first, second and third mobile stations 111, 113 and 115 are also located within the first mobile station area 110.

Let the first mobile station 111 be the source mobile station and the second, third and fourth mobile stations 113, 115 and 103 be the destination mobile stations. If the source mobile station 111 has information about the locations of the destination mobile stations 113, 115 and 103, it initializes P2P communication mode based on the location information of each destination mobile station and communicates with at least one of the destination mobile stations in the P2P communication mode. Since the fourth mobile station 103 is not within the first mobile station area 110, the source mobile station 111 cannot communicate with the fourth mobile station 103 in the P2P communication mode.

Meanwhile, if the source mobile station 111 has knowledge of the location of the third mobile station 115 only, and the source mobile station 111 does not have knowledge of the location of the second mobile station 113, it cannot conduct P2P communications with the second mobile station 113. Now a description will be made of an operation for establishing a P2P communication connection with the second mobile station 113 by the source mobile station 111 with reference to FIG. 2.

Figure 2:
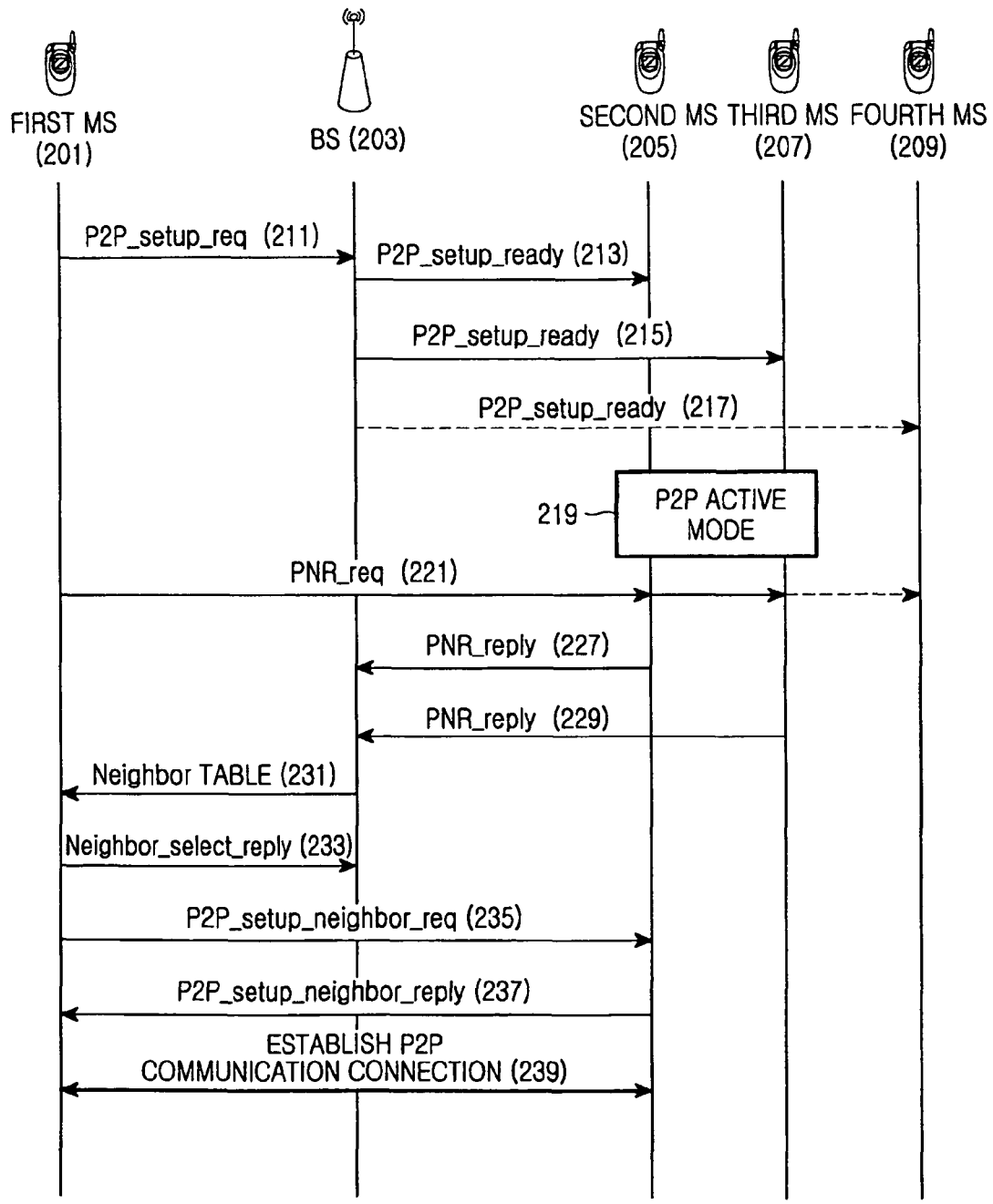
FIG. 2 is a diagram illustrating a signal flow for an operation for establishing a P2P communication connection with a destination mobile station by a source mobile station that has no knowledge of the location of the destination mobile station in the communication system according to an exemplary embodiment of the present invention.

FIG. 2 is a diagram illustrating a signal flow for an operation for establishing a P2P communication connection with a destination mobile station by a source mobile station that has no knowledge of the location of the destination mobile station in the communication system according to an exemplary embodiment of the present invention. The signal flow is, for example, for the case where the source mobile station communicates with a plurality of unspecified destination mobile stations and the case where the source mobile station communicates with a destination mobile station located in a Non-Line Of Sight (NLOS) path. The former case can be for upgrading the execution software of mobile stations, sharing files with mobile stations, or the like.

Referring to FIG. 2, the communication system includes first to fourth mobile stations 201, 205, 207 and 209. The first mobile station 201 is the source mobile station and the second, third and fourth mobile stations 205, 207 and 209 are the destination mobile stations.

Upon generation of P2P communication data, the first mobile station 201 transmits a P2P_setup_request message to a base station 203 in step 211. The base station 203 transmits a P2P_setup_ready message to the second and third mobile stations 205 and 207 among mobile stations 201, 205, 207 and 209 within its service area in steps 213 and 215. Thus, the second and third mobile stations 205 and 207 transition from sleep mode to P2P active mode in step 219. The transitioning of the destination mobile stations 205 and 207 from the sleep mode to the P2P active mode can reduce power consumption.

Meanwhile, the fourth mobile station 209, which is within the service area of the base station 203, is communicating with another mobile station. Hence, the fourth mobile station 209 does not transition to the P2P active mode, although receiving the P2P_setup_ready message in step 217.

After transmitting the P2P_setup_req message, the first mobile station 201 broadcasts a P2P Neighbor Report Request (PNR_req) message to the second, third and fourth mobile stations 205, 207 and 209, asking whether it can communicate with them by P2P in step 221. The second and third mobile stations 205 and 207 can receive the PNR_req message since they are in the P2P active mode. Then the second and third mobile stations 205 and 207 transmit P2P Neighbor Report Reply (PNR_reply) messages to the base station 203, indicating that they can conduct P2P communications in steps 227 and 229. Each of the PNR_reply messages includes information about the second or third mobile station 205 or 207, for example, information about the distance between source mobile station 201 and the second or third mobile station 205 or 207, contents information, transmission/reception power information, and so forth. The contents information can be a User Created Contents (UCC) file, a movie file, an image file, or the like, for example.

The base station 203 generates a Neighbor table including information about mobile stations capable of P2P communications based on the information about the mobile stations 205 and 207 included in the PNR_reply messages and transmits the Neighbor table to the first mobile station 201 in step 231. The first mobile station 201 selects destination mobile station for a P2P communication. In this example, the first mobile station 201 selects the second mobile station 205 from the Neighbor table and transmits the information about the second mobile station 205 to the base station 203 in a Neighbor_select_reply message in step 233. Hence, the base station 203 can now allocate resources for the first and second mobile stations 203 and 205.

Then the first mobile station 201 requests initialization of the P2P communication mode by transmitting a P2P_setup_neighbor_req message to the second mobile station 205 based on the information about the second mobile station 205 in step 235. The second mobile station 205 initializes a module for performing the P2P communication mode in response to the p2P_setup_neighbor_req message and replies to the first mobile station 201 with a P2P_setup_neighbor_reply message in step 237.

Upon receipt of the P2P_setup_neighbor_reply message, the first mobile station 201 establishes a P2P communication connection with the second mobile station 205 in step 239 and conducts P2P communications with the second mobile station 205.

FIG. 2 depicts the operation for establishing a P2P communication connection with a destination mobile station whose location information is not known to the source mobile station by the source mobile station, by way of example. If the source mobile station has knowledge of the location of the destination mobile stations, the procedure starts with step 235 in which the source mobile station transmits a P2P_setup_neighbor_req message to the destination mobile station, skipping steps 211 to 233.

On the other hand, if the base station 203 fails to receive a PNR_reply message from any of the second, third and fourth mobile stations 205, 207 and 209, it transmits a no_PNR message to the source mobile station 201, notifying the source mobile station 201 that P2P communications is not available.

Figure 3:
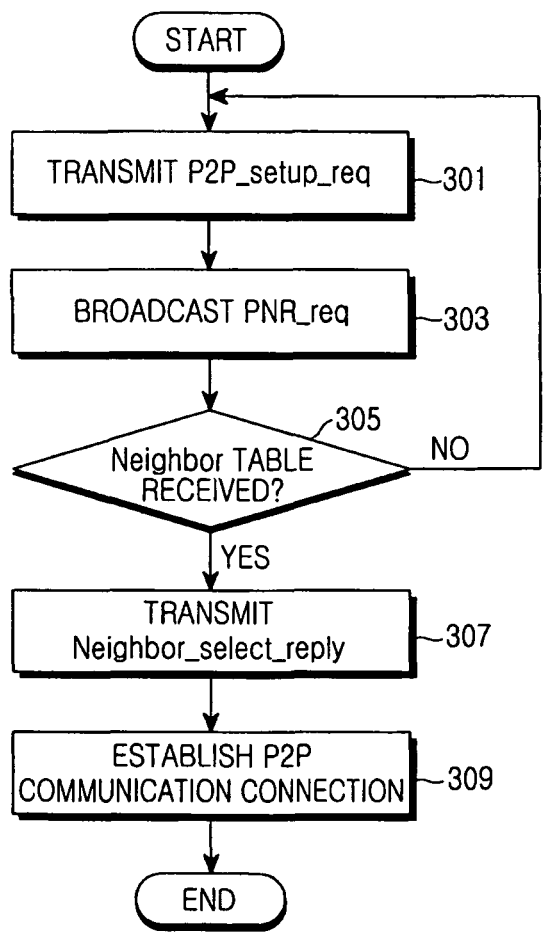
FIG. 3 is a flowchart illustrating an operation of a source mobile station that has no knowledge of the location of the destination mobile station, for establishing a P2P communication connection with the destination mobile station in the communication system according to an exemplary embodiment of the present invention.

FIG. 3 is a flowchart illustrating an operation of a source mobile station that has no knowledge of the location of a destination mobile station, for establishing a P2P communication connection with the destination mobile station in the communication system according to an exemplary embodiment of the present invention.

Referring to FIG. 3, upon generation of P2P communication data, the source mobile station transmits a P2P_setup_request message to a base station in step 301. The source mobile station then broadcasts a PNR_req message to every mobile station within the service area of the base station that is serving source mobile station, asking whether it can communicate with the mobile station by P2P in step 303. In step 305, the source mobile station monitors reception of a Neighbor table including information about mobile stations currently capable of P2P communications from the base station. Upon receipt of the Neighbor table, the source mobile station goes to step 307. If it has not received the Neighbor table, the source mobile station returns to step 301.

In step 307, the source mobile station selects a destination mobile station with which to conduct P2P communications according to the mobile station information included in the Neighbor table, for example, information about the distances between the source mobile station and the mobile stations, contents information, transmission/reception power information, and so forth, and transmits information about the selected destination mobile station to the base station in a Neighbor_select_reply message. The source mobile station establishes a P2P communication connection with the destination mobile station and conducts P2P communications with the destination mobile station in step 309.

Figure 4:
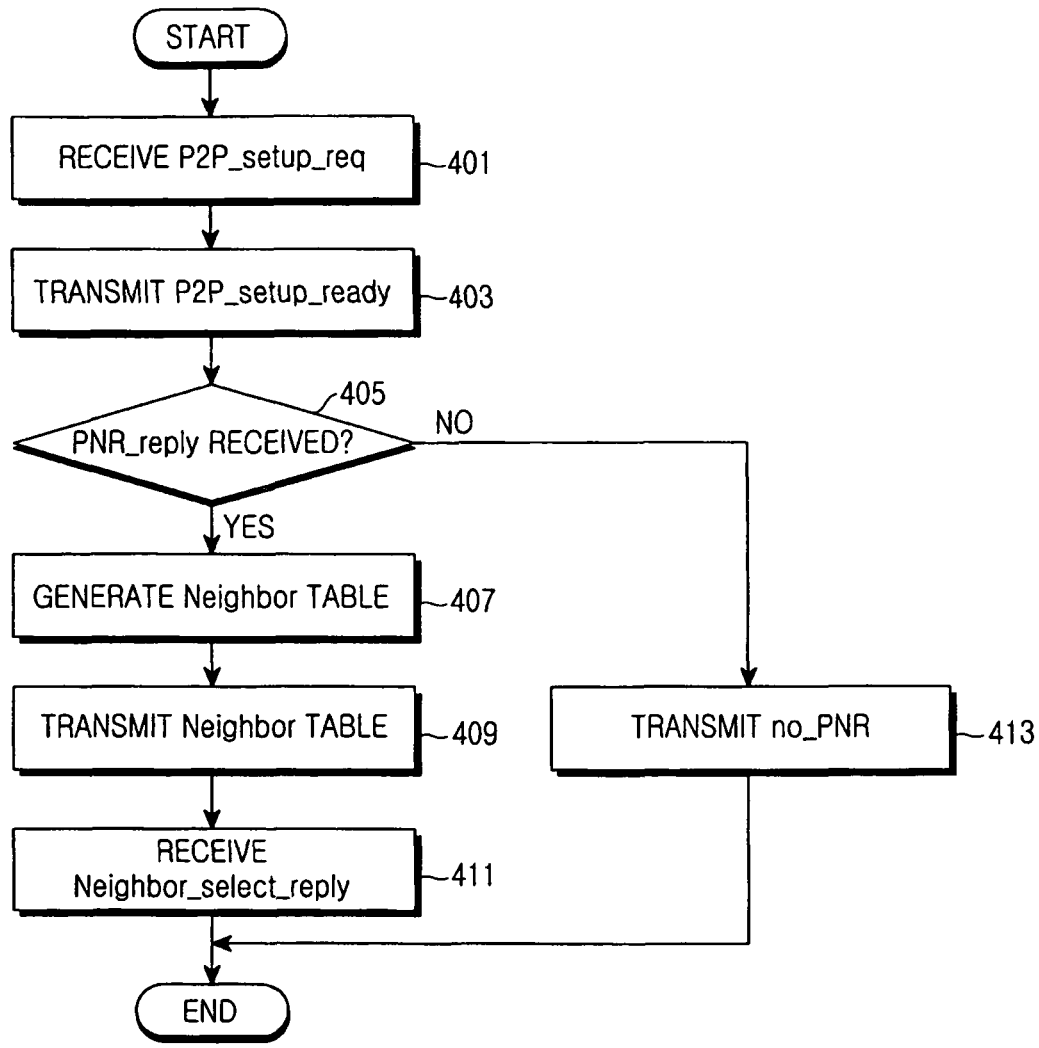
FIG. 4 is a flowchart illustrating an operation of a base station for enabling a P2P communication connection to be established between a destination mobile station and a source mobile station that has no knowledge of the location of the destination mobile station in the communication system according to an exemplary embodiment of the present invention.

FIG. 4 is a flowchart illustrating an operation of a base station for enabling a P2P communication connection to be established between a destination mobile station and a source mobile station that has no knowledge of the location of the destination mobile station in the communication system according to an exemplary embodiment of the present invention.

Referring to FIG. 4, the base station receives a P2P_setup_req message indicating generation of P2P communication data from the source mobile station in step 401 and transmits a P2p_setup_ready message to mobile stations other than source mobile station among mobile stations within its service area, to thereby transition the mobile stations from sleep mode to P2P active mode in step 403. In step 405, the base station monitors reception of PNR_reply messages from the mobile stations to which it transmitted the P2p_setup_ready message. Upon receipt of the PNR-reply messages, the base station goes to step 407. If the base station has not receives the PNR-reply messages, it goes to step 413. In step 413, the base station transmits a no_PNR message to the source mobile station, notifying the source mobile station that P2P communications are not available.

Meanwhile, the base station generates a neighbor table based on mobile station information set in the PNR_reply messages, for example, information about the distances between the source mobile station and the mobile stations, contents information, transmission/reception power information in step 407 and transmits the Neighbor table to the source mobile station in step 409. In step 411, the base station receives a Neighbor_select_reply message including information about a destination mobile station that will communicate with source mobile station by P2P from source mobile station.

As is apparent from the above description, the present invention advantageously facilitates a source mobile station initializing P2P communication mode by acquiring information about the location of a destination mobile station in a communication system. Therefore, as a cellular-based mobile station can conduct P2P communications, resource efficiency is increased.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for establishing a Peer-to-Peer (P2P) communication connection between mobile stations in a cellular communication system, comprising:
    transmitting a ready message to a plurality of second mobile stations within a service area of the base station to transition the plurality of second mobile stations to P2P active mode upon receipt of a request message requesting setup of a P2P communication connection from a first mobile station;
    receiving, from at least one second mobile station among the plurality of second mobile stations, a response message including mobile station information about each of the at least one second mobile station that transitioned to the P2P active mode among the plurality of second mobile stations;
    generating a neighbor table using the mobile station information about each of the at least one second mobile station, the mobile station information comprising distances between the first mobile station and the at least one second mobile station that transitioned to the P2P active mode; and
    transmitting the neighbor table to the first mobile station that transmitted the request message,
    wherein the P2P communication connection is established between the first mobile station and one or more second mobile stations which the first mobile station selects among the at least one second mobile station based on the neighbor table.

2. The method of claim 1, further comprising receiving, from the first mobile station, information about the one or more second mobile stations that are selected to establish the P2P communication connection with the first mobile station using the neighbor table.

3. The method of claim 2, wherein the neighbor table includes at least one of contents information and transmission/reception power information.

4. A system for establishing a Peer-to-Peer (P2P) communication connection between mobile stations in a cellular communication system, comprising:
    a base station configured to:
        transmit a ready message to a plurality of second mobile station within a service area of the base station to transition the plurality of second mobile stations to P2P active mode, upon receipt of a request message requesting setup of a P2P communication connection from a first mobile station,
        receive, from at least one second mobile stations among the plurality of second mobile stations, a response message including mobile station information about each of the at least one second mobile station that transitioned to the P2P active mode,
        generate a neighbor table including the mobile station information about each of the at least one second mobile station, the mobile station information comprising distances between the first mobile station and the at least one second mobile station that transitioned to the P2P active mode, and
        transmit the neighbor table to the first mobile station that transmitted the request message,
        wherein the P2P communication connection is established between the first mobile station and one or more second mobile stations which the first mobile station selects among the at least one second mobile station based on the neighbor table.

5. The system of claim 4, wherein the base station receives from the first mobile station information about the one or more second mobile stations that are selected to establish the P2P communication connection with the first mobile station using the neighbor table.

6. The system of claim 5, wherein the neighbor table includes at least one of contents information and transmission/reception power information.

7. A base station configured to establish a Peer-to-Peer (P2P) communication connection between mobile stations in a cellular communication system, the base station configured to:
    transmit a ready message to a plurality of second mobile stations within a service area of the base station to transition the plurality of second mobile stations to P2P active mode, upon receipt of a request message requesting setup of a P2P communication connection from a first mobile station,
    receive, from at least one second mobile station among the plurality of second mobile stations, a response message including mobile station information about each of the at least one second mobile station that transitioned to the P2P active mode among the plurality of second mobile stations,
    generate a neighbor table including the mobile station information about each of the at least one second mobile station, the mobile station information comprising distances between the first mobile station and the at least one second mobile station that transitioned to the P2P active mode, and
    transmit the neighbor table to the first mobile station that transmitted the request message,
    wherein the P2P communication connection is established between the first mobile station and a second mobile station which the first mobile station selects among the at least one second mobile station based on the neighbor table.

8. The base station of claim 7, wherein the base station receives from the first mobile station information about the one or more second mobile stations that are selected to establish the P2P communication connection with the first mobile station using the neighbor table.

9. The base station of claim 8, wherein the neighbor table includes at least one of contents information and transmission/reception power information.

10. The method of claim 1, further comprising transmitting a no_PNR message to the first mobile station in response to a failure to receive any response messages, wherein the no_PNR message indicates the P2P communication connection is not available.

11. The system of claim 4, wherein the base station transmits a no_PNR message to the first mobile station in response to a failure to receive any response messages, wherein the no_PNR message indicates the P2P communication connection is not available.

12. The base station of claim 7, wherein the base station transmits a no_PNR message to the first mobile station in response to a failure to receive any response messages, wherein the no_PNR message indicates the P2P communication connection is not available.

13. The method of claim 1, wherein each response message is received from one of the mobile stations that transitioned to the P2P active mode.

14. The method of claim 3, further comprising transmitting a no_PNR message to the first mobile station in response to a failure to receive any response messages, wherein the no_PNR message indicates the P2P communication connection is not available.

15. The method of claim 3, wherein the contents information comprises at least one of: a user created contents file, a movie file, and an image file.

16. The system of claim 4, wherein each response message is received from one of the mobile stations that transitioned to the P2P active mode.

17. The system of claim 6, wherein the base station transmits a no_PNR message to the first mobile station in response to a failure to receive any response messages, wherein the no_PNR message indicates the P2P communication connection is not available.

18. The system of claim 6, wherein the contents information comprises at least one of: a user created contents file, a movie file, and an image file.

19. The base station of claim 9, wherein the base station transmits a no_PNR message to the first mobile station in response to a failure to receive any response messages, wherein the no_PNR message indicates the P2P communication connection is not available.

20. The base station of claim 9, wherein the contents information comprises at least one of: a user created contents file, a movie file, and an image file.

\* \* \* \* \*